(12) United States Patent
Butler et al.

(10) Patent No.: US 9,268,920 B1
(45) Date of Patent: Feb. 23, 2016

(54) DYNAMIC LOCATION BASED CONTENT RIGHTS MANAGEMENT

(71) Applicant: Amazon Technologies, Inc., Reno, NV (US)

(72) Inventors: David George Butler, San Jose, CA (US); Andrew David Price, Santa Clara, CA (US); Arvind Thiagarajan, Cambridge, MA (US); Subram Narasimhan, Saratoga, CA (US); Yi Zhu, San Jose, CA (US); Shrinivas Mohan, Sunnyvale, CA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 102 days.

(21) Appl. No.: 14/023,003

(22) Filed: Sep. 10, 2013

(51) Int. Cl.
*G06F 17/30* (2006.01)
*G06F 21/10* (2013.01)

(52) U.S. Cl.
CPC .................................... *G06F 21/10* (2013.01)

(58) Field of Classification Search
CPC .......... G06F 21/10; H04B 7/185; H04B 7/26; H04H 20/08; H04H 40/90; H04H 60/21; H04H 60/23; H04N 21/4126; H04N 21/43637; H04N 21/4405; H04N 21/4524; H04N 21/61; H04N 21/6143; H04N 21/6193; H04N 21/64322; H04N 21/26606; H04N 21/4181; H04N 21/4325; H04N 21/4334; H04N 21/63345; H04N 7/163; H04N 7/1675
USPC ............................................................ 726/30
See application file for complete search history.

(56) References Cited

U.S. PATENT DOCUMENTS

| 8,194,876 B2 * | 6/2012 | Kim et al. ........................ 381/77 |
| 2010/0262828 A1 * | 10/2010 | Brown et al. ................. 713/171 |
| 2013/0205328 A1 * | 8/2013 | Ling et al. ........................ 725/25 |

* cited by examiner

*Primary Examiner* — Kambiz Zand
*Assistant Examiner* — Abiy Getachew
(74) *Attorney, Agent, or Firm* — Seyfarth Shaw LLP; Ilan N. Barzilay; Joseph M. Walker

(57) ABSTRACT

A system and method for controlling access to digital content based on proximity and location of a user device. A user device connects to a local network and an audio transmission including a perpetually rolling key is transmitted within a geo-fence in the local area. The user device hears the audio transmission and uses the key to authenticate to a content server over the network. Once authenticated, the user device may then stream content from the content server. In order to terminate access to the content when the user device leaves the geo-fence, the content server may require the key to be retransmitted from the user device at regular intervals to re-authenticate the user device. Other factors such as radio fingerprints from the user device may also be used instead of or in addition to the audio to verify the user device's presence within the geo-fence.

16 Claims, 14 Drawing Sheets

DYNAMIC LOCATION BASED CONTENT RIGHTS MANAGEMENT

BACKGROUND

Various devices may be configured to receive and play or display content including audio, video, and written content. With the increasing availability of content over the Internet and the use of mobile devices, content owners, for example, attempt to control access to and copying of their content using digital right management (DRM) and other techniques. Some approaches involve providing restricted access to content using encryption techniques, restrictive licenses, and/or private networks.

BRIEF DESCRIPTION OF DRAWINGS

For a more complete understanding of the present disclosure, reference is now made to the following description taken in conjunction with the accompanying drawings.

DETAILED DESCRIPTION

Figure 1:
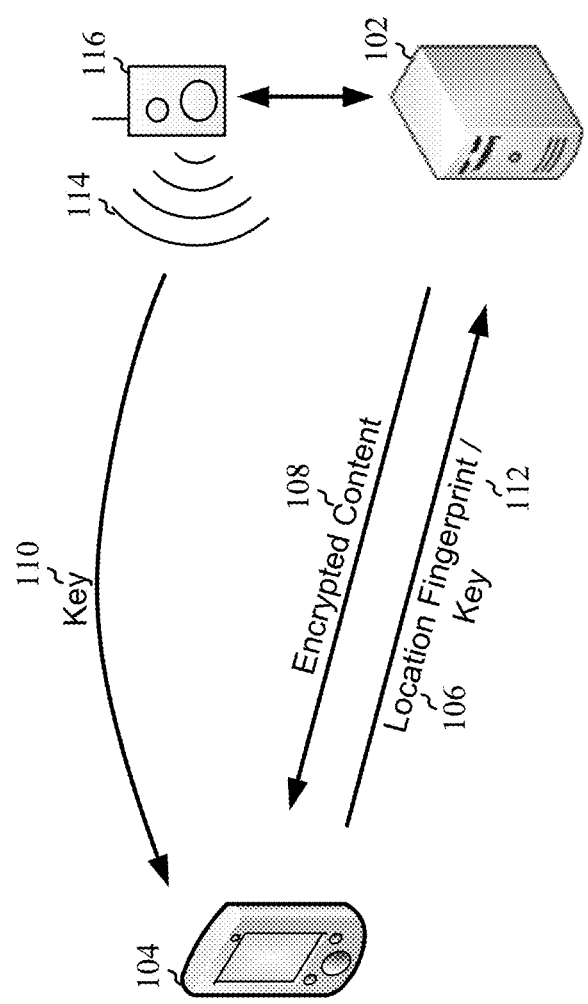
FIG. 1 illustrates a system overview for implementing one aspect of the disclosure.

Aspects of the present disclosure includes devices, systems and methods for controlling access to content based on a proximity or presence of a device, such as a computing device, a laptop computer, a cellular phone, a personal digital assistant (PDA), a tablet computer, a wearable device, other mobile device, etc. within a defined area. The identification of the proximity or presence may be based on geographic coordinates, proximity to another entity or device, ability to receive a localized transmitted signal, such as a radio frequency (RF) signal, an audio signal, an infrared (IR) signal, or some combination of one or more of these techniques. In one aspect, access to the content may be available when the device is within a virtual perimeter or other permitted located, such as a geo-fence, which may be either two-dimensional (such as a within a defined floor space) or three-dimensional (such as within a defined multiple-level floor space(s)). The geo-fence may be dynamic or have predefined boundaries. This geo-fencing enables content to be shared, viewed, and consumed within approved establishments or areas when the device is within the geo-fence, rather than based on time, identity-based authentication and authorization, or other non-location based authentication/authorization methods.

In an aspect, combinations of a rolling key transmission via audio or WiFi, and in some embodiments augmented with geographic location data, such as global positioning system (GPS) data, are used to establish position of a media consumption device, also referred to a user device, and/or the device's proximity to a particular reference point. The proximity to an approved location serves as an authorization token enabling consumption of rights constrained media.

In an example, an establishment, such as a coffee-shop, a hotel, department store, airport, train station or other type of commercial establishment, may desire to encourage customers to spend more time on the premises and arrange for protected content to be made available in a network to anyone in the premises of the establishment. However, the establishment also desires to prevent access to the content by any user or device outside of the establishment. In an aspect, the establishment may have a device on the premises that announces the availability of the DRM content via a radio frequency (RF) transmission, such as a WiFi access point or other suitable wireless communication connections. Simultaneously an audio transmission may be transmitted including a perpetually rolling key using audio frequency at a low volume, ultrasonic frequency and/or other audio within or outside the range of human detection (generally outside the range of approximately 20~20,000 Hz). The key sequence may be synchronized with a content server to allow the content to be accessed with the key.

While the RF transmission may penetrate walls, the audio signal containing the key should be unable to be received outside of the establishment, thus limiting the recipients of the key to those located within the authorized physical space. In this aspect, when a customer or user enters the establishment, the user's device or a device provided to the user by the establishment can connect to the network, and receive the audio signal. This user device may then decode the key and use the key to authenticate/authorize to the device with the content server over the network. Once authenticated/authorized, the user device may then access content from the content server.

In order to terminate access to the content when the user/user device leaves the establishment, the content server may require the key to be retransmitted from the user device at regular intervals to re-authorize the user device. For increased security other factors such as radio fingerprints from the consumption device may also be required in addition to the audio to verify the user device's ongoing presence within the geo-fence. A radio fingerprint is a representation of wireless signals that is detectable by a device. The radio fingerprint may include the identity of certain detectable wireless signals, such as signals associated with certain WiFi networks and/or specific transmitters or access points, cellular signals, Bluetooth signals, other RF transmissions, etc. The radio fingerprint may include associated signal strengths for detected RF signals. Radio fingerprints may change with changes in location, for example as certain wireless signals become undetectable (or lose strength) and others become detectable (or gain strength). Thus a radio fingerprint taken by a device at a specific location may serve as an identifier of the device's location or proximity to certain wireless transmitters. If a user device has a radio fingerprint that demonstrates the user device detects the same RF signals (and possibly with the appropriate signal strengths) as would be expected within the prescribed area, the user device may be permitted to access the restricted content. If the user device fails to answer the server's challenge for dynamic proximity specific characteristics, such as the audio key and/or radio fingerprint, the media stream transmission and/or authentications/authorizations may be terminated. Other techniques, such as a rolling key that changes at regular short intervals may also be incorporated to avoid content being accessed by a device outside the prescribed area. Location of a device may also be confirmed by the device's ability to detect a haptic communication, i.e., a tactile communication such as a vibration pattern, etc. Such a haptic communication may be transmitted by a device (such as a vibration emitter) connected to a physical surface (such as a table top, counter, etc.) upon which a user device may be placed. If the user device is capable of detecting the haptic communication and confirming receipt of the communication to the system, the system then knows that the user device is located on the specific physical surface and may allow the user device to access the restricted content. The physical surface may also include a haptic receiver to receive haptic communications (such as a confirmation) from the user device.

In an aspect, the device on the premises may be a device provided by the establishment to a customer or user. The user can pick up the device from the establishment and authenticate/authorize as described herein. In this aspect, when the user leaves the confines of the geo-fence, the user may be charged for the content, the device or both. In another aspect, the establishment may provide the user with a device the user may use to authenticate/authorize as described herein, and access content. In these aspects, the establishment may facilitate a purchase and return implementation. For example, the user may place the device in a return area, which may also be a geo-fence, to return the device, and optionally a return receipt may be emailed to the user. Also, if the user leaves the geo-fence with the device, the use may be charged for the purchase of the device, the content, or both.

In another aspect, data may be transmitted from a first device, also referred to as a sending device, to one or more additional devices, also referred to as a receiving device, via an audio transmission. In this aspect, a speaker of the first device may transmit an audio signal, which may be a frequency at a low volume and/or other transmission conditions undetectable to the human ear, including the data and a microphone of the one or more additional devices receives the audio signal. The data may be coded, such that the receiving device cannot access the data. In many devices, it may be impractical for the device receiving the out of band information to perform the necessary processing to decode it. In this situation, the receiving device receives the coded data and transmits proof of receipt, which may include transmitting the coded data back to the sending device, which signifies that the receiving device did in fact receive the correct audio signal. The sending device then decodes the coded data and transmits the decoded data to the receiving device. This allows data to be wirelessly transmitted from one device to another within a proximity of the sending device without the need to connect to a network, and provides security in that the receiving device transmits proof of reception to the sending device.

The following description provides exemplary implementations of the disclosure. Persons having ordinary skill in the field of computers, audio, and multimedia technology will recognize components and process steps described herein that may be interchangeable with other components or steps, or combinations of components or steps, and still achieve the benefits and advantages of the present disclosure. Moreover, in the following description, numerous specific details are set forth in order to provide a thorough understanding of the disclosure. It will be apparent to one skilled in the art, however, that the disclosure may be practiced without some or all of these specific details. In other instances, well-known process steps have not been described in detail in order not to unnecessarily obscure the disclosure.

Although media content is described in several aspects of the present disclosure in the form of audio and video streams, the present disclosure is not so limited. Accordingly, while examples in the subsequent discussion are presented in regard to streamed media generally, it should be appreciated that aspects of the present disclosure may be applied to many types of media content.

FIG. 1 illustrates a system overview according to an aspect of the disclosure. A first device 102, for example a content server, announces the availability of content via a wireless transmission, for example, a radio frequency (RF), WiFi network, or other wireless transmission. The first device 102 may be fixed in location, for example, at a premises, or may be mobile, and corresponds to a content owner or one having rights to the content.

A second device 104, also referred to as a user device, connects to the first device 102 and transmits a fingerprint 106 to the first device 102. This fingerprint 106 provides a proximate or relative location of the user device 104. In an example, the fingerprint is a radio fingerprint determined by the number and signal strength of available networks at a particular location. In this example, the user device 104 transmits data relating to the available networks and the corresponding signal strengths, i.e. the radio fingerprint. Using this information, the first device 102 identifies a position of the user device 104 or proximity of the user device 104 to an authorized location, i.e. within a geo-fence, based on the strength and availability of networks at varying locations.

This proximity/positioning enables the first device 102 to determine whether the user device 104 is within the geo-fence established based on proximity to the authorized location, for example, within a hotel. If the user device 104 is within the geo-fence, the first device 102 may allow the user device 104 to access encrypted content 108 by causing transmission of a key 110 to the user device 104, which allows the user device 104 to decrypt and access the content. The user device 104 may also be required to transmit the key (illustrated as 112) back to the first device 102 to authenticate/authorize to the first device 102.

The key 110 may be a rolling key 110 that changes at pre-defined intervals, for example, every 1 minute, 2, minutes, 5 minutes, or other interval. This rolling key 110 allows the first device 102 to terminate the user device's 104 access to the content by stopping transmission of the key 110 or stopping transmission of content 108 to the user device 104 when the user device 104 moves outside of the geo-fence.

In an aspect, the rolling key 110 is transmitted via an audio signal 114, for example, an ultrasonic audio signal, by an audio transmission device 116, such as a speaker in wired or wireless communication with the first device 102. This can be advantageous in that such an audio signal 114 may be unable to penetrate solid surfaces/walls, thereby establishing a geo-fence within a building or other establishment. Using the audio transmission, the user device 104 would cease receipt of the key 110 when the user device 104 exits the establishment. In another aspect, the first device 102 may require the user device 104 to transmit the key 110 and/or the radio fingerprint 106 back to the first device 102 each interval for re-authorization and to identify if the user device 104 is outside of the geo-fence.

The first device 102 and the audio transmission device 116 may be a single device or may be separate devices. In one example, the first device 102 is a content server located off of the premises of the hotel or shop where the content is authorized to be accessed and is accessible over a network, such as the Internet. In this example, the audio transmission device 116 may be linked to the first device 102 over the network and located in one or more locations on the premises. There may also be multiple audio transmission devices 116 on the premises to allow for the audio signal to reach all areas of the premises. The device which authorizes access to the content may also be separate from the device which actually stores the content.

Figure 2:
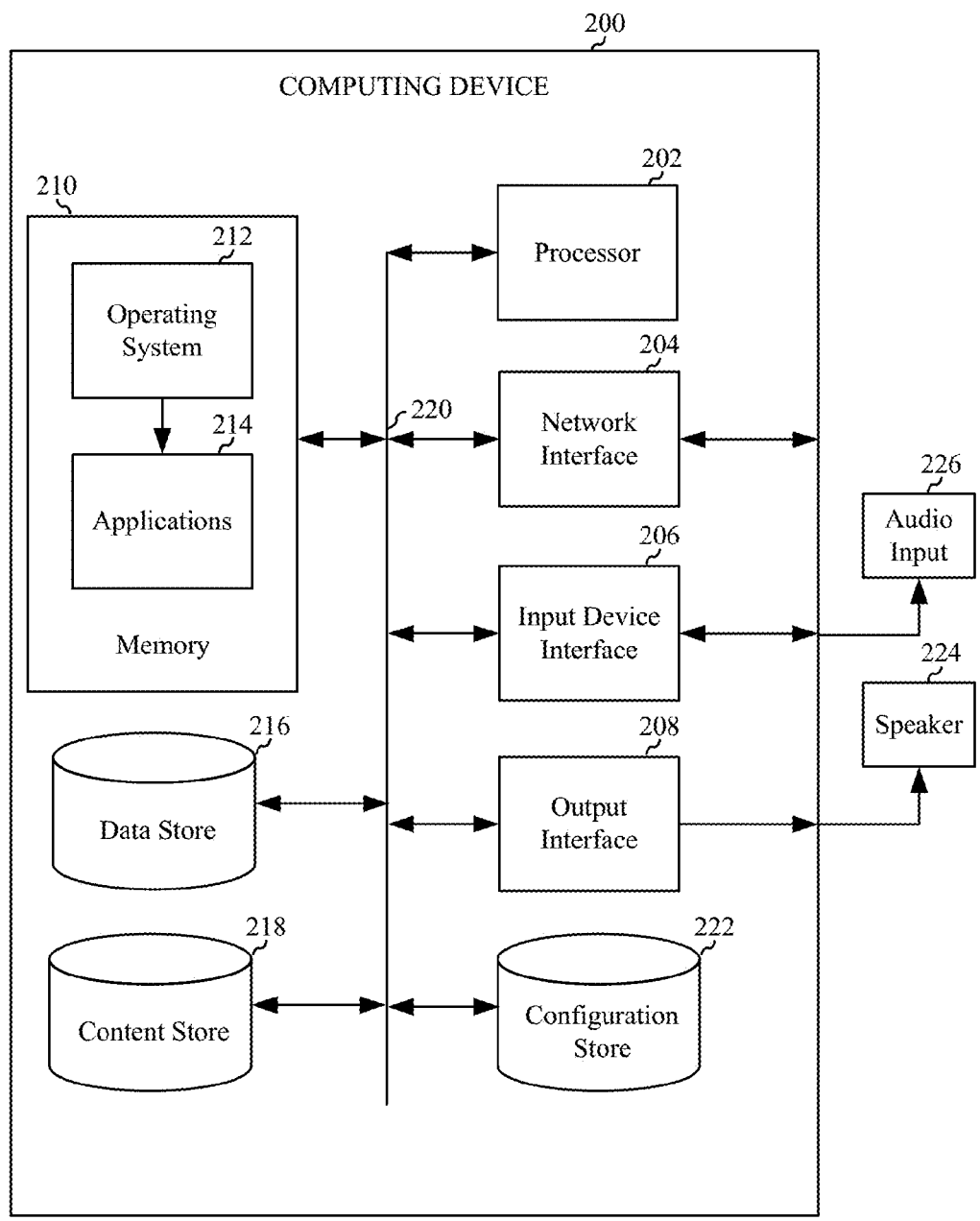
FIG. 2 illustrates a block diagram conceptually illustrating a computing device according to one aspect of the present disclosure.

Aspects of the present disclosure may be implemented as a computer implemented method in a computing device or computer system. These computing devices may include, but are not limited to, mobile phones, laptop computers, tablet computers, personal computers, workstations, mini- and mainframe computers, servers, and the like. These computing devices may also include specially configured computers for processing digital multi-media content. The general architecture of a suitable computing device is described below with reference to FIG. 2. More particularly, FIG. 2 is a block diagram illustrating exemplary components of a computing device 200 suitable for processing and streaming media content. However, the following description of the exemplary components of a computing device 200 should be viewed as illustrative only and not construed as limiting in any manner. In one aspect, the device 102 or the user device 104 shown in FIG. 1 may be implemented as the exemplary computing device 200, for example. In another aspect, the exemplary computing device 200 or components of the exemplary computing device 200 may be implemented locally in the audio transmission device 116 shown in FIG. 1, for example.

With regard to FIG. 2, the exemplary computing device 200 may include a processor 202 in communication with a variety of other components over a system bus 220 or through a direct connection. These other components may include, by way of example, a network interface 204, an input device interface 206, an output interface 208, and a memory 210. As appreciated by those skilled in the art, the network interface 204 enables the computing device 200 to communicate data, control messages, data requests, and other information with other resources including computers, data sources, storage devices, and the like, on a computer network such as the Internet. The network interface 204 may be configured to communicate via wired or wireless connections. As one skilled in the art will appreciate, the computing device 200 may obtain a media content, such as streamed audio and/or video from another computer, a storage device, or other source via the computer network. The computing device 200 may also save the media content to a networked location or send it to another computer or satellite on the network, for example.

The input device interface 206, sometimes also embodied as an input/output interface, enables the computing device 200 to obtain data input from a variety of devices including, but not limited to, a microphone, a digital pen, a touch screen, a keyboard, a mouse, a scanner, and the like. In addition to the exemplary components described above, an output interface 208 may be used for outputting information such as audio signals or display information. Audio signals may be output to the audio transmission device 116, the user device 104 and/or the device 102, for example. Display information may be output by the output interface 208 via a display device (e.g., a monitor or similar device, not shown), for example. Audio output may also be output by the output interface 208 to an audio device such as a speaker 224, for example. An audio input device 226, such as a microphone, may also input audio to the computing device 200. Of course, while not shown, one skilled in the art will appreciate that one or more speakers 224 and/or audio input devices 226, may be incorporated as integral elements within a computing device 200 or may be separate therefrom.

The processor 202 may be configured to operate in accordance with programming instructions stored in a memory 210. The memory 210 generally comprises RAM, ROM, and/or other memory. Thus, in addition to storage in read/write memory (RAM), programming instructions may also be embodied in read-only format, such as those found in ROM or other permanent memory. The memory 210 may store an operating system 212 for controlling the operation of the computing device 500. The operating system may be a general purpose operating system such as a Microsoft Windows operating system, a UNIX operating system, a Linux operating system, or an operating system specifically written for and tailored to the computing device 200. Similarly, the memory 210 may also store user-executable applications 214, or programs, for conducting various functions on the computing device 200. For example, the application 214 in memory 210 may be configured according to aspects of the present disclosure to control access to content within a geo-fence.

The computing device 200 optionally includes a data store 216, a content store 218, and/or a configuration store 222, depending on how the computing device 200 is to be used. For example, if the computing device 200 is a device 102 shown in FIG. 1 it may include the data store 216, the content store 218 and the configuration store 222. If the computing device 200 is configured on the audio transmission device shown in FIG. 1, it may include the configuration store 222 without an additional content store 218, or a data store 216, for example.

The data store 216 may store location data associated with network availability and signal strength information and may be used to determine the proximity or presence of a user device in relation to the geo-fence according to aspects of the present disclosure. The content store 218 may be used to store the content that is transmitted and/or received by the computing device 200. The configuration store 222 may store the rolling key information for accessing or encrypting and decrypting the content, for example.

It should also be understood that the following description is presented largely in terms of logic and operations that may be performed by conventional computer components and media components. These computer components, may be grouped in a single location or distributed over a wide area. In circumstances where the computer components are distributed, the components may be accessible to each other via wired and/or wireless communication links, for example.

Figure 3:
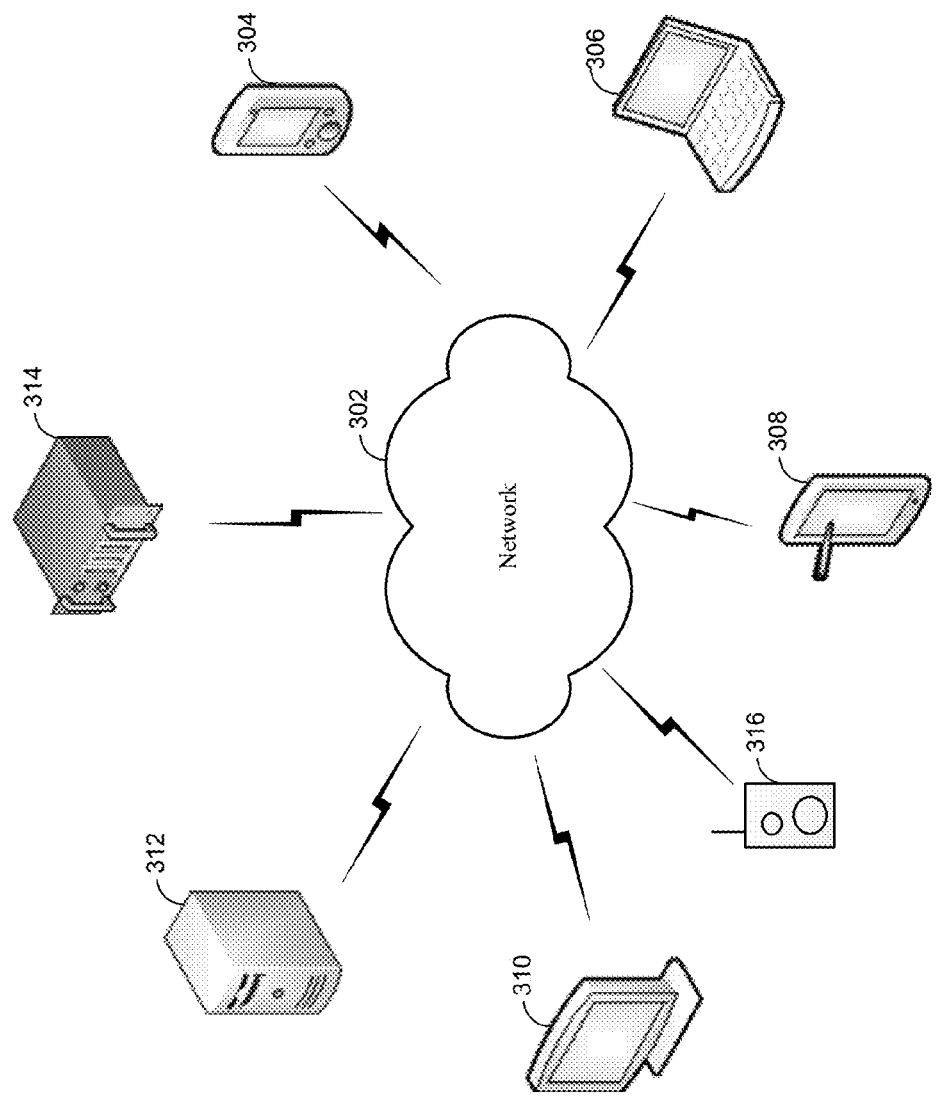
FIG. 3 illustrates a computing network for use with distributed processing according to one aspect of the present disclosure.

As shown in FIG. 3, multiple devices may be connected over a network 302. Network 302 may include a local or private network or may include a wide network such as the Internet. Devices may be connected to the network 302 through either wired or wireless connections. For example, a wireless device 304 may be connected to the network 302 through a wireless service provider. Other devices, such as laptop 306 or tablet computer 308 may be capable of connection to the network 302 using various connection methods including through a wireless service provider, over a WiFi connection, or the like. Other devices, such as computer 310, may connect to the network 302 through a wired connection.

In certain system configurations, one or more remote devices may store and stream the content to the user device. For example, content may be sent over the network 302 to wireless device 304 by computer 312 or server 314. The content may be streamed or transmitted in another fashion. In another aspect, an audio transmission device 316 may be in communication with a content server, for example server 314, and receive synchronization data from the server 314 corresponding to the rolling key that the audio transmission device 316 transmits locally to a user device, for example wireless device 304.

Figure 4:
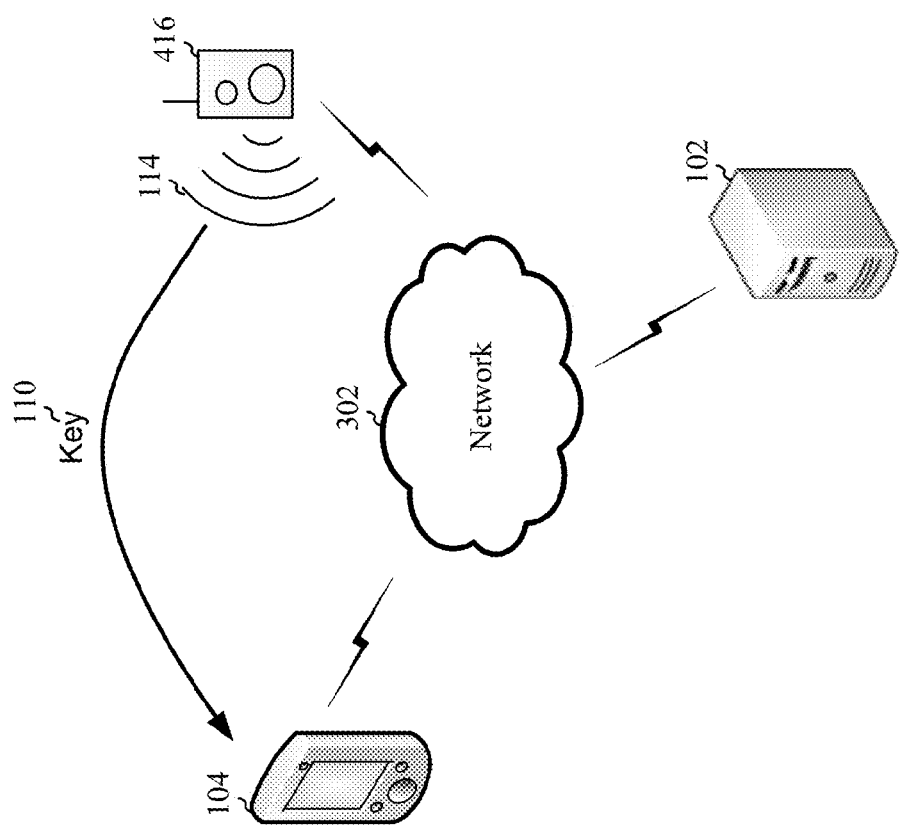
FIG. 4 illustrates a distributed environment according to one aspect of the present disclosure.

One configuration of the present disclosure is shown in FIG. 4. In this configuration, a remote device 102 may include the media content, and stream the media content to a user device 104 over a network 302. A local device 416 with an audio transmitter is in communication with the remote device 102 over the network 302 and in communication with the user device 104 via audio signal 114. In this embodiment, the remote device 102 may communicate with the local device 416 to synchronize the rolling key 110 with the content being streamed by the remote device 102. The rolling key is transmitted by the local device 416 to the user device 104 for use in accessing the streaming content on the remote device 102. The network 302 may be a wide area network such as the Internet, a local area network, a network allowing physical connection of the devices, a wireless communication network, or other suitable connection between the devices including a direct (wired or wireless) connection.

In another example, content is not streamed from remote device 102 but rather sent to user device 104 for storage on user device 104. However, in order for a user to access the protected content stored on the user device 104, the local device must have access to the key 110 without which playback of the content will not be permitted. In this example, the user device 104 may check the key 110 with local device 416 and/or remote device 102 prior to accessing the content. Or the key 110 may be checked against the content itself which may be encrypted to only allow access with the proper key 110, as described below. In this aspect, the key 110 may still be location dependent such that the user device 104 will be prohibited from accessing the content if the user device 104 is outside the prescribed geo-fence.

The systems and methods disclosed herein allow for location based rights management. As an example, a library allows users to obtain and read, watch, and/or otherwise consume media within the library. However, there may be limited number of authorized copies of a particular item of content in the library, which in turn may limit the number of users that can consume the content at any given time. Further, a library may only permit access to certain materials while in the library. Using the systems and methods disclosed herein, the library could provide digital content to user devices while ensuring that the user devices is within the walls/geo-fence of the library.

As another example, book stores and other establishments may own or have rights to digital libraries to allow customers access to certain content when the customers are within the physical space of the book store. Again, using the systems and methods disclosed herein, the book store could provide the content to user devices of the customers when the user device is within the walls/geo-fence of the book store. This can equally be applied to any situation in which access to content and data is desired to be limited to a location or proximity to a location or device.

Figure 5:
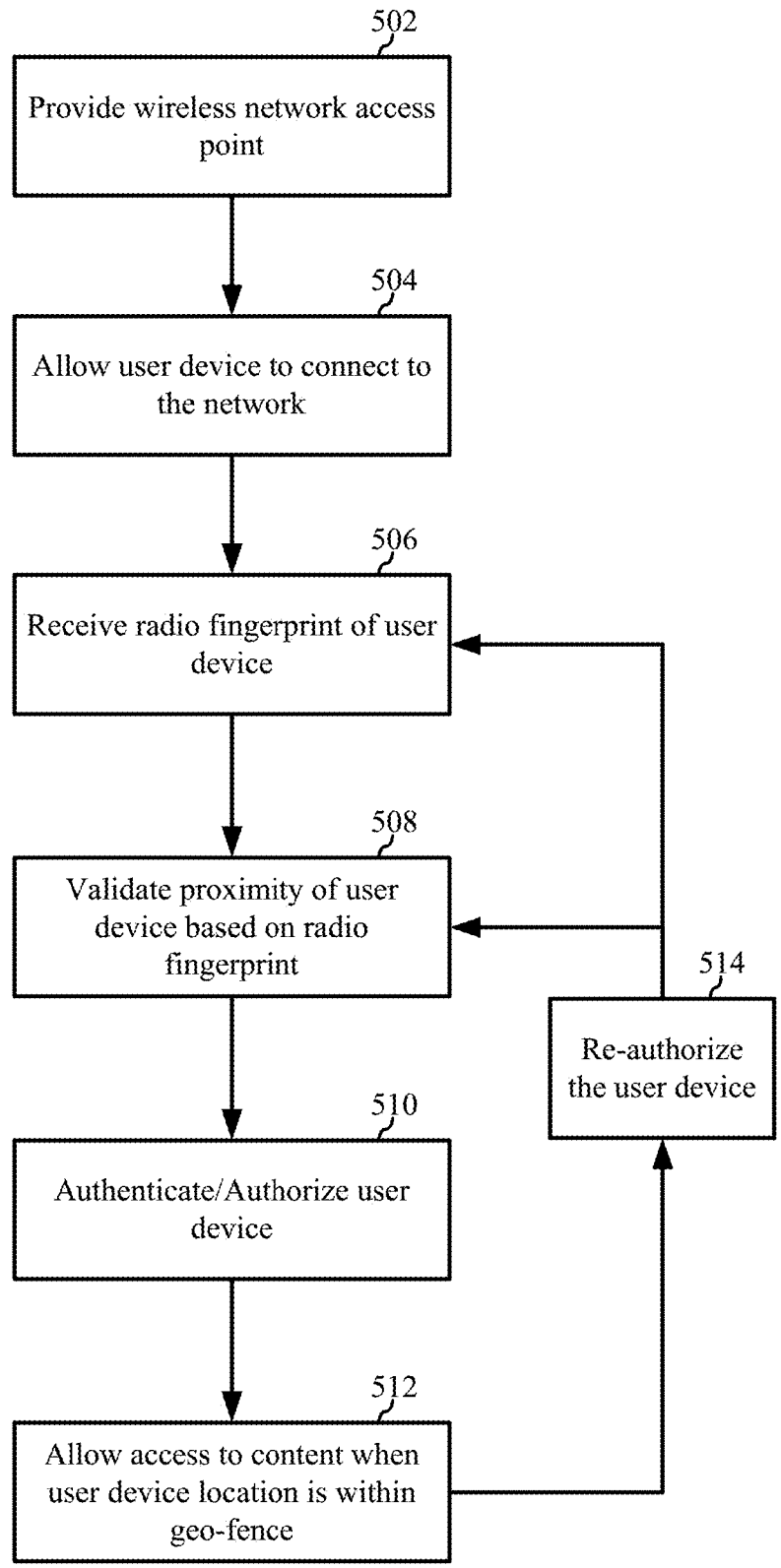
FIG. 5 is a flow diagram illustrating an exemplary routine for performing dynamic proximity based content access management according to aspects of the present disclosure.

FIG. 5 is a flow diagram illustrating an exemplary method for performing dynamic location based content access management. As an example, one or more of the logical components of FIGS. 1-3 may perform the methods disclosed herein. In block 502, a wireless network access point is provided, for example, in an establishment, which may include transmitting a radio frequency (RF), WiFi access, or other wireless transmission. A user device is allowed to connect to the wireless network, illustrated as block 504. The user device sends a radio fingerprint over the network to a content server, which receives the radio fingerprint, illustrated as block 506. As described above, the radio fingerprint may be information corresponding to network(s) and their associated signal strength(s) available to the user device. In one example, at least one available network should be indicated by the wireless network service set identifier (SSID) and the associated signal strength of the network corresponding to the content server as seen by the user device.

The content server identifies or validates a presence or proximity of the user device with respect to the establishment based on the radio fingerprint, illustrated as block 508. The presence of the user device may also be determined using other information such as GPS data. The user device is authenticated on or authorized to access the content server, illustrated as block 510, when the user device is within a geo-fence/proximity of the establishment. The user device is then allowed to access the content on the content server, illustrated as block 512. In an aspect, to prevent access to the content when the user device has moved outside of the establishment/geo-fence, the content server may require the user device to re-authorize or perform a location/proximity check at pre-set or varying intervals, for example, every 1 minute, 2 minutes, 3, minutes, etc. This re-authorization/check may include repeating steps 506-512 or 508-512 to confirm the presence or absence of the user device, illustrated as block 514.

In one aspect, the wireless network access point transmits a RF signal. In this aspect, to identify when a user device has moved out of the geo-fence, the RF signal may be changed, for example, by changing the power of the signal, changing the SSID, etc. Thus, when the user device re-authorization, i.e., in steps 506-512, the user device would need to be picking up the signal change/SSID change, which would be identified in the radio fingerprint, in order to continue to have access to the content on the content server.

Figure 6:
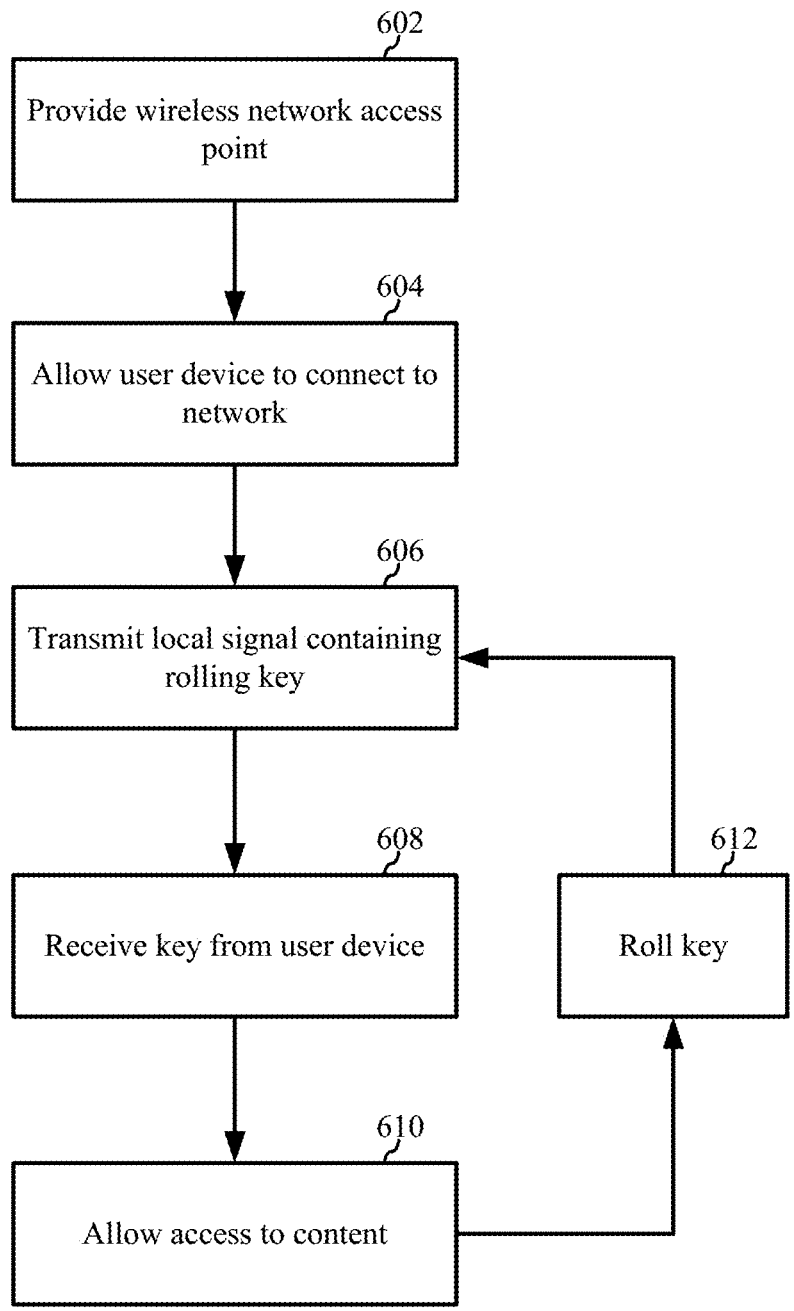
FIG. 6 is a flow diagram illustrating an exemplary routine for performing dynamic proximity based content access management according to aspects of the present disclosure.

FIG. 6 is a flow diagram illustrating another exemplary method for performing dynamic location based content management. In block 602, a wireless network access point is provided, for example, in an establishment, that can allow access to content on a content server. A user device is allowed to connect to the wireless network, illustrated as block 604. A signal containing a rolling key is transmitted within the geo-fence, illustrated as block 606. The user device receives the key and transmits the key (or some authentication and/or confirmation based at least in part on the key, such as a hash-based message authentication code (HMAC)) to the content server, which receives the key from the user device, illustrated as block 608. The confirmation may be sent to the content server via network communications or through other communications, such as by audio, IR, haptic communication, or whatever medium the key itself was transmitted in. The user device is then authorized to access the content on the content server, illustrated as block 610. To prevent access to the content when the user device is moved out of the establishment/geo-fence, the key is a rolling key and changes over time, and the content server may require a new key at pre-set or varying intervals, for example, every 1 minute, 2 minutes, 3, minutes, etc. in order to access the content. This may include repeating steps 606-610 to ensure the user device, can still receive the current key, as illustrated as block 612.

In this example, the rolling key may be transmitted via an audio signal, such as an ultrasonic audio signal. Ultrasonic audio signals generally fail to propagate through solid surfaces well, which tend to attenuate the audio significantly. Higher frequency audios at lower amplitudes are stopped completely by walls. If the user device cannot hear the audio signal, the user device is likely outside of the establishment/geo-fence and access to the content should be terminated. Thus, by using a rolling key transmitted via an audio signal, which does not propagate through walls, the user device will not be able to hear the audio signal if the user device is moved out of the establishment, thereby terminating access to the content.

In an aspect, the rolling key may be a cryptographic key, which may derive a new key, and the content may be encrypted. Since the key changes over time, the encryption of packets or the parts of the content also changes. For example, each page of an ebook or each section of a streaming movie could be encrypted with a different key. As another example, different types of content may be encrypted with different keys, and the audio signal may include more than one key, i.e. one for the different types of content. In this aspect, the rolling key is used by the user device to decrypt the content. When the user device cannot hear the current rolling key, the user device cannot decrypt the next packet or portion of the streaming content and access to the content is prevented. This method may be used in conjunction with or be substituted for the re-authorization described herein.

Figure 7:
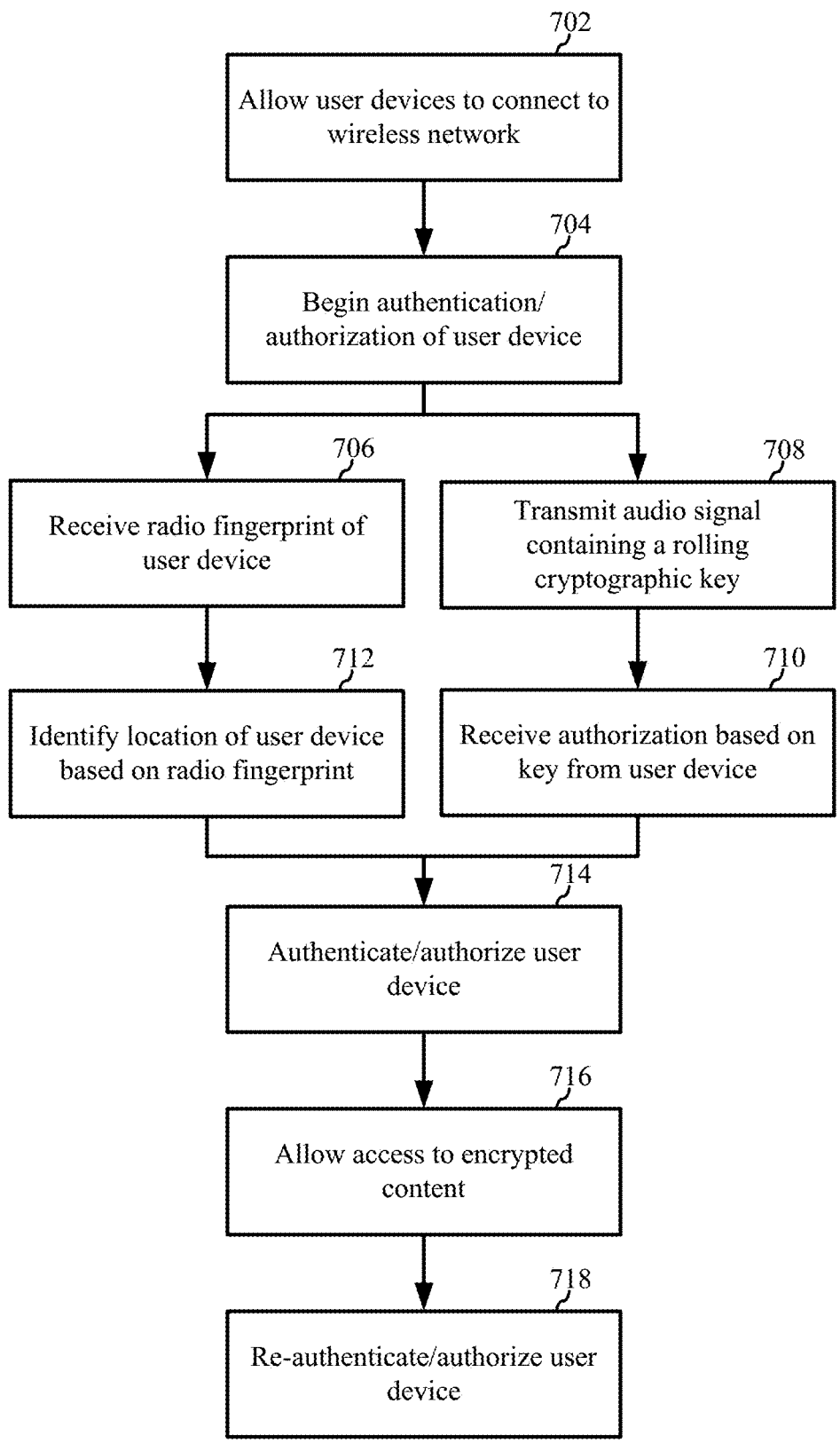
FIG. 7 is a flow diagram illustrating an exemplary routine for performing dynamic proximity based content access management according to aspects of the present disclosure.

FIG. 7 is a flow diagram illustrating another exemplary method for performing dynamic location based content rights management combining various techniques. In block 702, a user device is allowed to connect to the wireless network. Upon connecting to the network, an authentication/authorization of the user device is performed, illustrated as block 704. To authenticate/authorize the user device, a content server requests and the user device sends a radio fingerprint over the network to the content server, which receives the radio fingerprint, illustrated as block 706. At substantially the same time, an audio signal containing a rolling cryptographic key is transmitted within the geo-fence, illustrated as block 708. The user device receives authorization based on the key, illustrated as block 710. In an aspect, the authorization may include the user device receiving the key and transmitting the key to the content server. In another aspect, the authorization may be the user device receiving the key, which the user device uses to decrypt encrypted content.

The content server identifies a proximity or presence of the user device with respect to the establishment based on the radio fingerprint, illustrated as block 712. The user device is authenticated/authorized on the content server when the key matches the current key on the content server and the location/proximity of the user device is determined to be within the geo-fence, illustrated as block 714. Once authenticated/authorized, the user device is allowed to access the encrypted content on the content server, illustrated as block 716, which the user device uses the key to decrypt. To prevent access to the content when the user device is moved out of the establishment/geo-fence, the content server may require the user device to re-authenticate/re-authorize or perform a location/proximity check at pre-set or varying intervals, for example, every 1 minute, 2 minutes, 3, minutes, etc. This re-authentication/re-authorization may include repeating steps 704-714 to obtain the current location/proximity of the user device and ensure the user device can hear the audio signal, illustrated as block 718. Additionally, when the user device cannot receive the current rolling key, the user device cannot decrypt the next packet or portion of the streaming content and access to the content is prevented.

Figure 8:
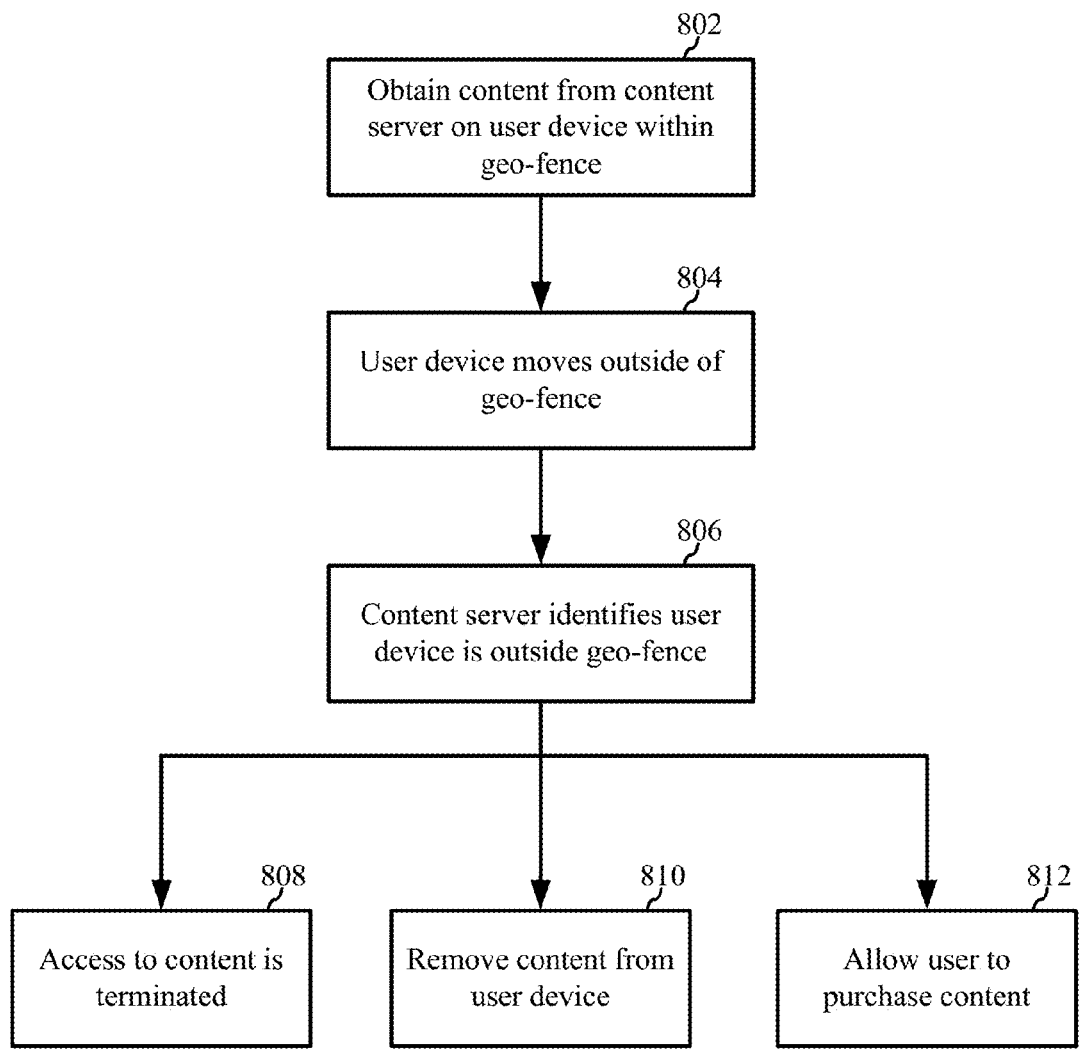
FIG. 8 is a flow diagram illustrating an exemplary routine for allowing a user to purchase content according to aspects of the present disclosure.

In an aspect, the content server may prompt or provide the user with the ability to purchase the content when the user leaves or moves the user device out of the geo-fence. FIG. 8 illustrates an exemplary method of allowing a user to purchase digital content. In block 802, the user is obtaining content from the content server on the user device within the geo-fence. The user then moves the user device outside of the geo-fence, illustrated as block 804. When the content server attempts to re-authenticate/re-authorize or checks the location/proximity of the user device, the content server identifies that the user device is outside the geo-fence, illustrated as block 806. When the content server identifies that the user device is outside the geo-fence, access to the content may be terminated, illustrated as block 808, any content stored on the user device may be removed, illustrated as block 810, and/or the user may be prompted to purchase the streaming content, illustrated as block 812. In an aspect, the user may also be automatically charged for the purchase, when the user leaves the geo-fence.

In this aspect, a user may be streaming a movie or an ebook on the user device and travel outside of the geo-fence prior to finishing the ebook or movie. When the user device moves outside the geo-fence, the user may be prompted to purchase the ebook or movie, if the user so desires, so the user may finish the ebook or movie later at any time. When purchasing such content, the user may need to set up or access a user account and input user information and payment information to complete the transaction and download the purchased content, as known by persons of ordinary skill in the art. The user may also be able to purchase any of the content on the content server when the user is within the geo-fence.

Figure 9:
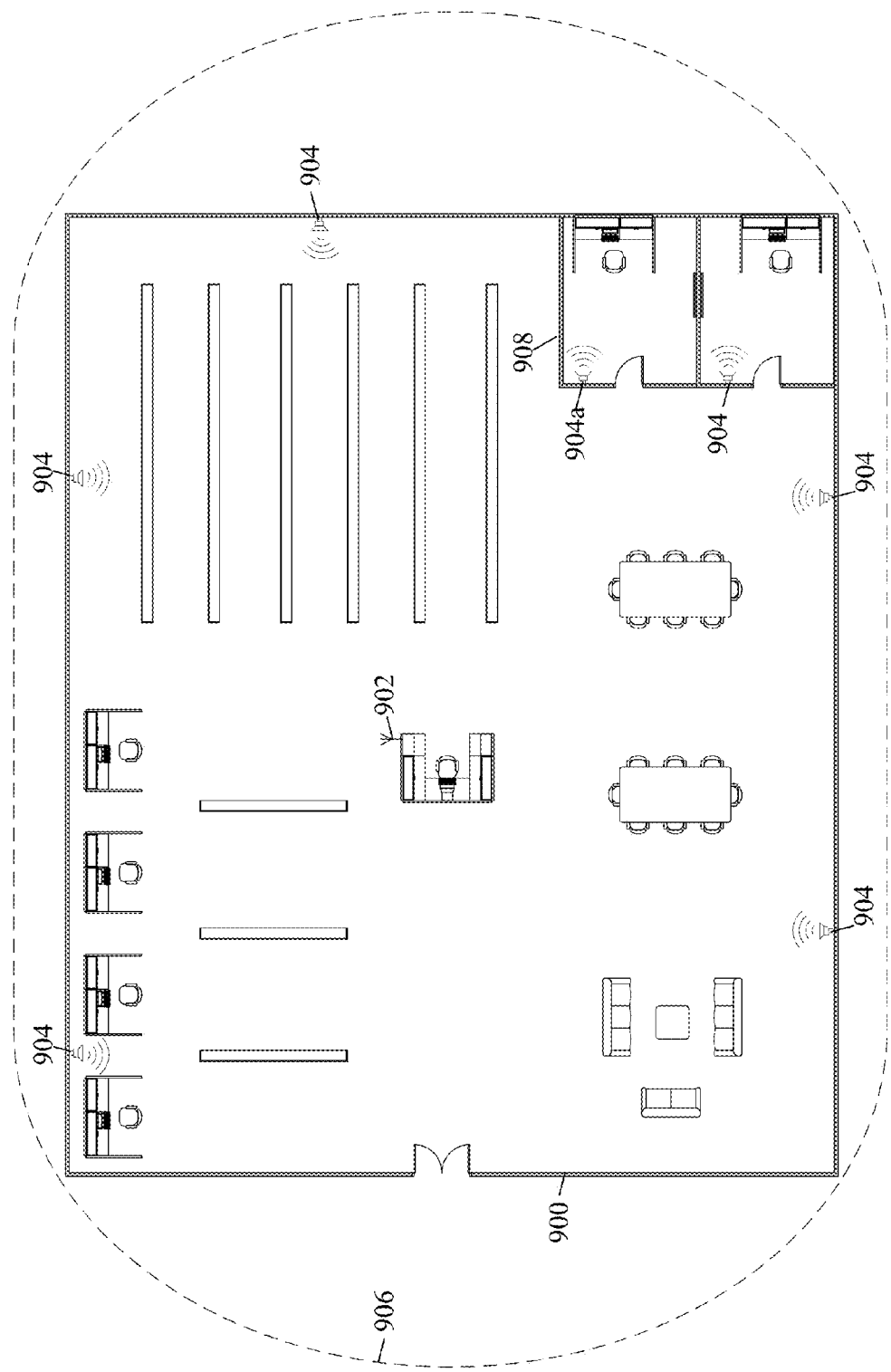
FIG. 9 illustrates an implementation of dynamic proximity based content access management according to aspects of the present disclosure.

FIG. 9 illustrates an exemplary implementation of the methods described above. A floor plan of a library having walls 900 is illustrated. Inside the walls 900, a network transmitter 902 is placed in a central location that provides network access. Additionally, there are one or more audio transmission devices 904 disposed around the floor plan. The network transmitter 902 has a range identified by the dashed line 906, which extends outside the walls 900. A user device may pick-up the network signal when the user device is within the network boundary 906. However, to prevent a user device from accessing content outside the walls 900, the audio authentication/authorization described above is implemented. The audio signal is transmitted including the rolling key described above, via the one or more audio transmission devices 904.

As described above, the user device requires the rolling key to access content via the network, and the audio does not propagate through the walls 900. Thus, when the user device is outside the walls 900, the user device cannot obtain the rolling key, which prevents the user device from accessing the content. On the other hand, when the user device is within the walls 900, the user device should be able to obtain the rolling key and have access to the content. Different keys may be transmitted to only allow access in certain areas of the library. For example, certain content may only be permitted to be accessed in room 908, the key for which may only be broadcast by device 904*a*. In an aspect, the audio transmission device 904a in room 908 may be coupled to the door by a switch. In this aspect, the audio transmission device 904a in room 908 may only transmit audio when the door to room 908 is closed.

As illustrated in FIG. 9, there are numerous audio transmission devices 904. This is to enable users, perhaps in a separate room, for example room 908, to hear the audio signal. Additionally, there may be furniture or other obstacles in the area the can block the audio signal. By using numerous audio transmission devices 904, all synchronized with the content server to transmit the current rolling key, user devices in all areas of the floor can hear the audio signal.

In an aspect, using the methods described above, dynamic location based content management can be achieved. This prevents access to content when the user device travels outside of a geo-fence. The geo-fence may be mobile, for example, when the above systems and methods are implemented in a train or other moving vehicle. In these examples, the geo-fence may be defined as a proximity to a certain point in the moving vehicle.

Figure 10:
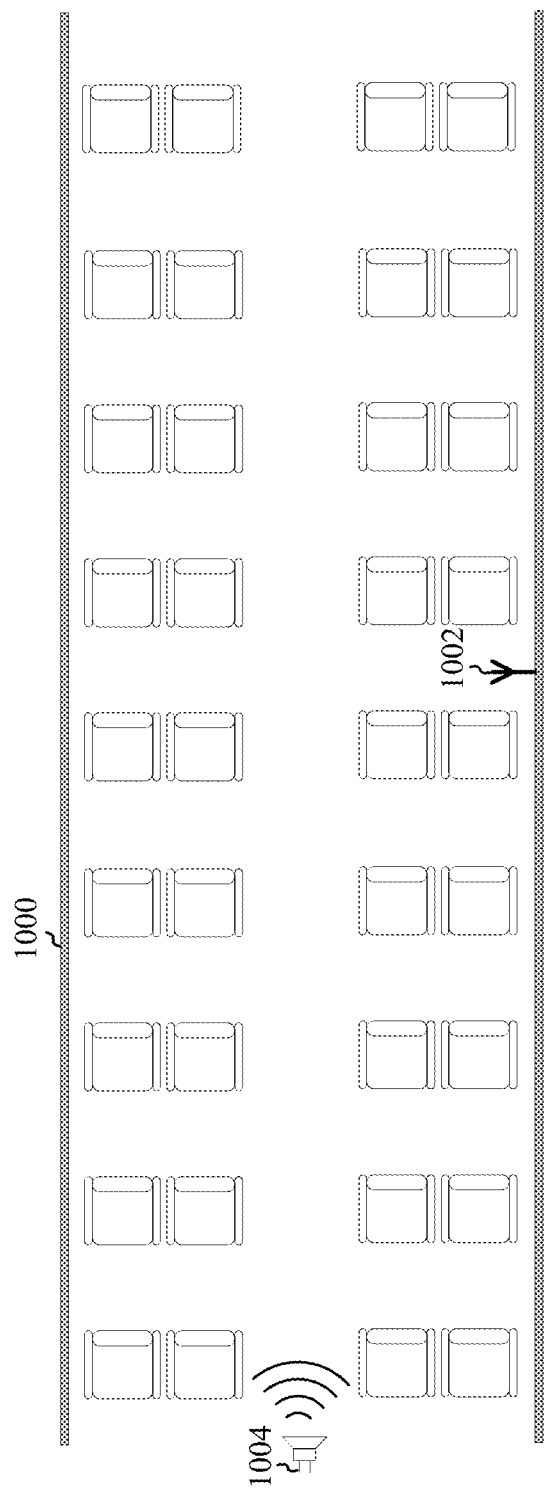
FIG. 10 illustrates an implementation of dynamic proximity based content access management according to aspects of the present disclosure.

FIG. 10 illustrates an exemplary implementation of the methods described above in a moving vehicle, such as a train. Inside the walls 1000, a network transmitter 1002 is placed in a location that provides network access within the walls 1000. Additionally, there are one or more audio transmission devices 1004 disposed within the walls 1000. A user device within the walls connects to the network and receives the audio signal transmitted by the audio transmission device(s) 1004. As described above, the audio signal includes the rolling key. In this example, the geo-fence is continually moving, and the audio signal allows a proximity of the user device(s) to the network transmitter 1002 to be identified. For example, when the user device receives the rolling key being transmitted by the audio transmission device(s) 1004, the user device may be required to send the key to a content server, whether located within the walls 1000 or at a remote location via the network. If the key transmitted to the content server matches the current rolling key, the user device is authorized to access content on the content server. If the user device can hear the rolling key, the user device must be within the geo-fence since the audio signal cannot be hear outside of the walls 1000. This enables a dynamic geo-fence to be created based on proximity to a moving authentication/authorization device.

Figure 11:
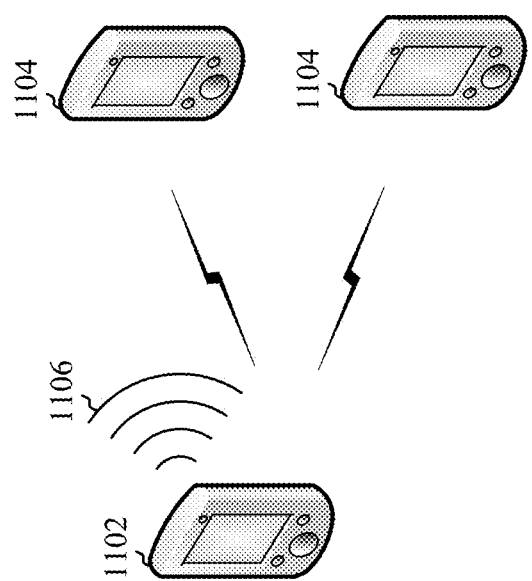
FIG. 11 illustrates an implementation of dynamic proximity based content access management according to aspects of the present disclosure.

FIG. 11 illustrates another exemplary implementation of the methods described above in a user device. In this example, a first user device 1102 may stream content to other user devices, such as, second user devices 1104. To control access to the content, to within a proximity or geo-fence around the first user device 1102, the first user device 1102 transmits an audio signal 1106 containing a key, which may be a rolling key as described above. Thus, in order to access the streaming content the other user devices 1104 must be able to hear the key being transmitted by the first user device 1102. In another aspect, the content may be encrypted for access on a specific device to allow device specific access to certain content.

Figure 12:
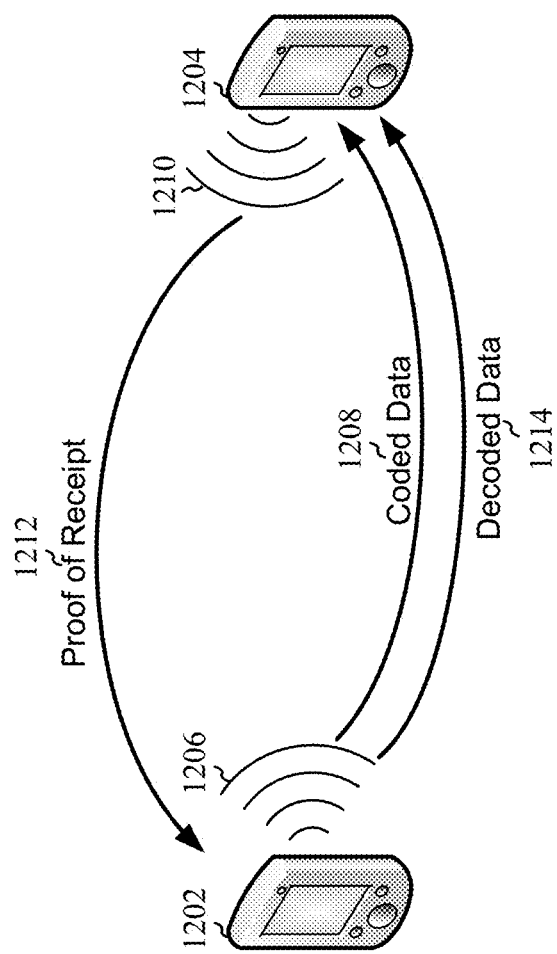
FIG. 12 illustrates an implementation of sending data using an audio signal according to aspects of the present disclosure.
Figure 13:
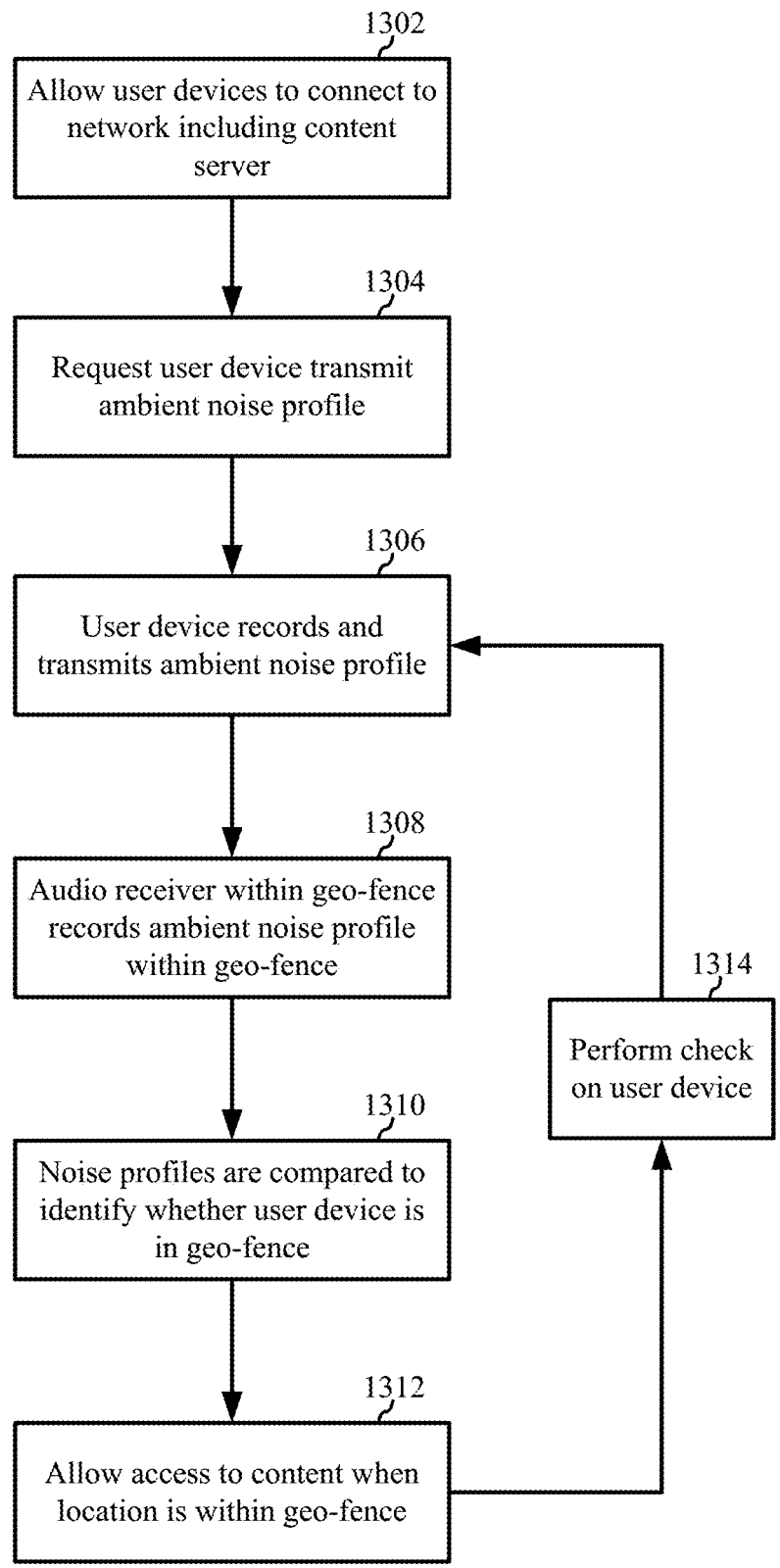
FIG. 13 is a flow diagram illustrating an exemplary routine for performing dynamic proximity based content access management according to aspects of the present disclosure.

In another aspect, data may be transmitted from a first device, also referred to as a sending device, to one or more additional devices, also referred to as a receiving device, via an audio transmission. FIG. 12 illustrates an exemplary implementation of sending data from a first device 1202 to a second device 1204. As illustrated, the first device 1202 transmits an audio signal 1206, which may be a frequency at a low volume and/or ultrasonic, including coded data 1208. It should be appreciated that a special configuration audio transmitter may be needed to broadcast the audio signal at an ultrasonic frequency. The second device 1204 hears the audio signal 1206 and receives the coded data 1208. The second device 1204 cannot access the coded data 1208 and may not know what the data is. The second device 1204 then transmits an audio signal 1210, which may be a frequency at a low volume and/or ultrasonic, including proof of receipt 1212, which may include the coded data 1208, back to the first device 1202. The proof of receipt may also be sent using a different medium such as WiFi, Bluetooth, or other medium. This signifies to the first device 1202 that the second device 1204 did in fact hear the correct audio signal 1206. The first device 1202 decodes the coded data and transmits the decoded data 1214 to the second device 1204 using the audio signal 1206. This allows data to be wirelessly transmitted from one device to another within a proximity of the sending device without the need to connect to a network, and provides security in that the receiving device transmits proof of reception to the sending device.

In other aspects, other location techniques, such as infrared (IR) signal detection, Bluetooth, and/or global positioning system (GPS) techniques, may be used instead of or in combination with the techniques described above to determine the user device location/proximity, for example. As an example, an IR pulse may be used to transmits the rolling key instead of or in addition to using the audio transmission described above. In this example, the user device may include an receiver that can receive the IR pulse containing the rolling key. Receipt of the IR pulse also have the ability to limit access to a desired location/proximity/within a geo-fence since in order for the user device to receive the IR pulse, the user device need to be within a line of sight of the IR pulse transmitter. Various location techniques may also be combined to obtain a location/proximity, either absolute or relative to various other media emitting sources.

Another location/proximity identification technique may include comparing ambient noise profiles/signatures of user devices to noise profiles/signatures within the geo-fence. FIG. illustrates a method of performing content management using ambient noise profiles/signatures. In block 1302, a user device connects to a network within a geo-fence. The user device is then requested to transmit an ambient noise profile, for example, to a content sever, illustrated as block 1304. The user device turns on a microphone of the user device, records an ambient noise profile, and transmits the profile, for example, to the content sever, illustrated as block 1306. One or more audio receivers, such as audio input devices 226, may be positioned within the geo-fence and also record ambient noise profile(s) within the geo-fence, illustrated as block 1308. The noise profiles are compared to each other to determine whether the user device is within the geo-fence, illustrates as block 1310. If the user device is in the geo-fence, the user device is allowed to access content on the content server, illustrated as block 1312.

In an aspect, to prevent access to the content when the user device is moved out of the geo-fence, the content server may perform a location/proximity check at pre-set or varying intervals, for example, every 1 minute, 2 minutes, 3, minutes, etc. This check may include repeating steps 1306-1312 to obtain the location/proximity of the user device, illustrated as block 1314. In another aspect, multiple user devices may be used to establish a noise profile within the geo-fence.

In another aspect, the one or more audio receivers, such as audio input devices 226, positioned within the geo-fence may receive audio and the user device(s) may transmit a key. In this aspect, authorization and access to content may be based on the audio receivers in the geo-fence receiving a key specific to the user's device. This may also provide for specific content encryption based on the key of the user device.

Figure 14:
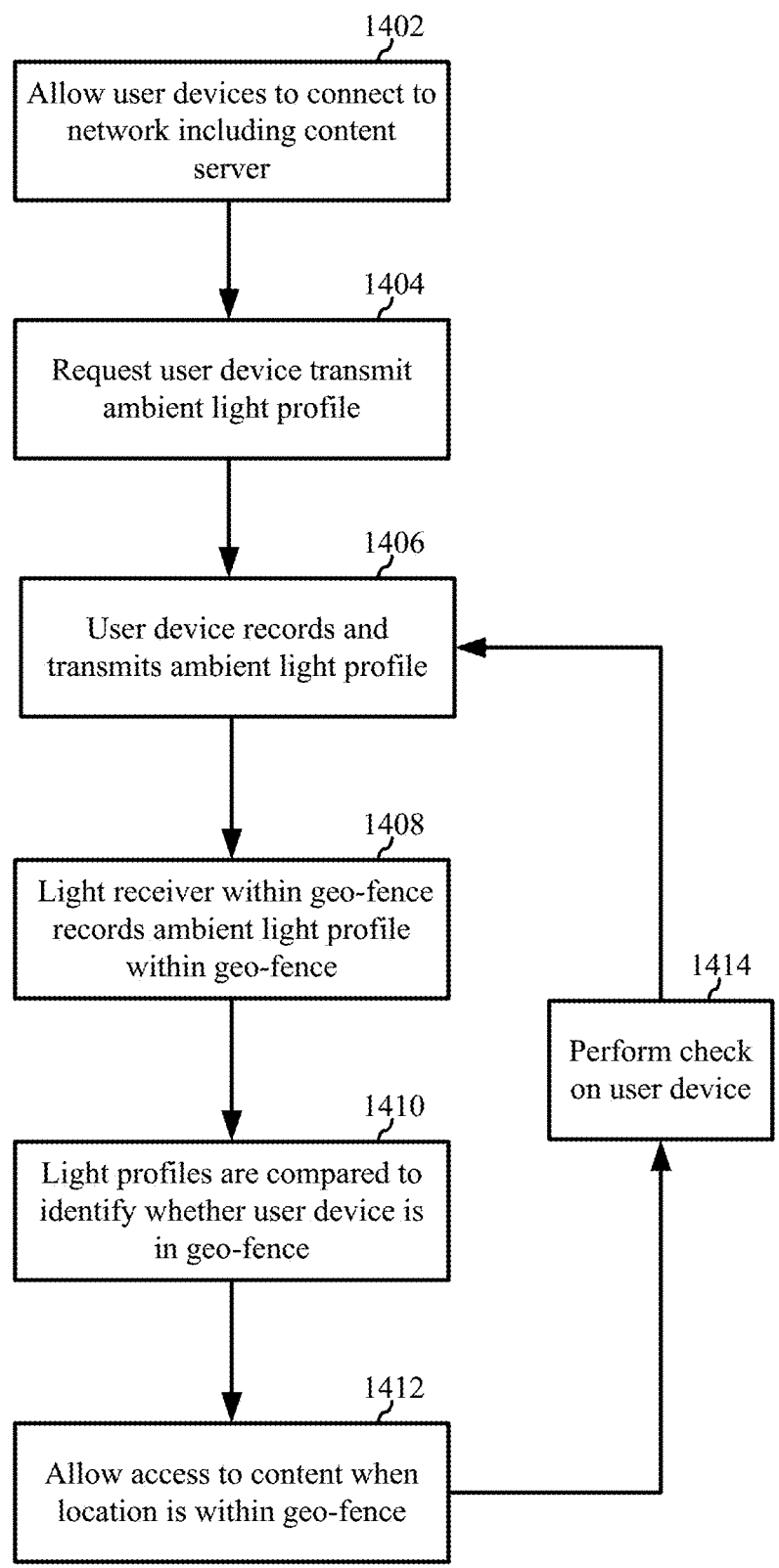
FIG. 14 is a flow diagram illustrating an exemplary routine for performing dynamic proximity based content access management according to aspects of the present disclosure.

Another location/proximity identification technique may include comparing ambient light profiles/signatures of user devices to light profiles/signatures within the geo-fence. FIG. 14 illustrates a method of performing content management using ambient light profiles/signatures. In block 1402, a user device connects to a network within a geo-fence. The user device is requested to transmit an ambient light profile, for example, to a content sever, illustrated as block 1404. The user device turns on a light sensor of the user device, records a ambient light profile, and transmits the profile, for example, to the content sever, illustrated as block 1406. One or more light sensors are positioned within the geo-fence and also record ambient light profile(s) within the geo-fence, illustrated as block 1408. The light profiles are compared to each other to determine whether the user device is within the geo-fence, illustrates as block 1410. If the user device is in the geo-fence, the user device is allowed to access content on the content server, illustrated as block 1412. The content server may also perform a location/proximity check at pre-set or varying intervals by repeating steps 1406-1412 to obtain the location/proximity of the user device, illustrated as block 1414. In another aspect, multiple user devices may be used to establish a light profile within the geo-fence.

As discussed above, the various embodiments may be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and protocols. Such a system also may include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of communication, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java, C, C# or C++, or any scripting language, such as Perl, Python, or TCL, as well as combinations thereof. The server(s) may also include database servers, including without limitation those commercially available from Oracle, Microsoft, Sybase, and IBM.

The environment may include a variety of data stores and other memory and storage media as discussed above. These may reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, keypad, or microphone), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the system or device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A method for controlling access to digital content, comprising:
   providing a user accessible wireless network;
   transmitting a first audio signal within a local area, the first audio signal including a first content access key;
   receiving a first key confirmation from a user device, wherein the user device received the audio signal and wherein the first key confirmation is based at least in part on the first content access key;
   receiving a radio fingerprint of the user device, the radio fingerprint including a signal strength of the wireless network detected by the user device;
   determining the user device is within the local area based at least in part on the radio fingerprint and receiving the first key confirmation;
   allowing the user device to access digital content via the wireless network based at least in part on receipt of the first key confirmation;
   changing the first content access key to a second content access key at a predetermined time interval;
   transmitting a second audio signal within the local area, the second audio signal including the second content access key;
   determining the user device is outside the local area based at least in part on failing to receive a second key confirmation from the user device; and
   discontinuing to allow the user device to access the digital content via the wireless network based at least in part on determining the user device is outside the local area.

2. The method of claim 1, wherein the transmitting of the first audio signal includes transmitting an ultrasonic audio signal.

3. The method of claim 1, wherein the first content access key is a first cryptographic key and the digital content is encrypted using the first cryptographic key.

4. The method of claim 3, wherein the cryptographic key is configured for a specific user device.

5. A method for controlling access to digital content, comprising:
   transmitting an audio signal in a local area, the audio signal including a content access key;
   receiving a confirmation that a user device received the content access key;
   receiving a radio fingerprint of the user device, the radio fingerprint including a signal strength of a wireless network detected by the user device;
   determining the user device is within the local area based at least in part on the radio fingerprint and receiving the confirmation;
   allowing the user device to access digital content based at least in part on determining the user device is within the local area;
   performing a check on a location of the user device at a predetermined time interval;
   determining the user device is outside the local area based at least in part on performing the check; and
   discontinuing to allow the user device to access the content based at least in part on determining the user device is outside the local area.

6. The method of claim 5, wherein performing the check comprises transmitting a second audio signal including a second content access key, and wherein determining the user device is outside the local area is based at least in part on failing to receive a second confirmation that the user device received the second content access key.

7. The method of claim 5, wherein performing the check comprises transmitting an infrared signal including a second content access key, and wherein determining the user device is outside the local area is based at least in part on failing to receive a second confirmation that the user device received the second content access key.

8. The method of claim 5, wherein the audio signal is transmitted in a frequency range inaudible to humans.

9. The method of claim 5, wherein the content access key is a cryptographic key and the digital content is encrypted using the cryptographic key.

10. The method of claim 5, wherein the confirmation is received in a second audio signal.

11. A system for controlling access to digital content, comprising:
    at least one processor;
    a memory including instructions operable to be executed by the at least one processor to perform a set of actions, configuring the at least one processor:
       to transmit an audio signal in a local area, the audio signal including a content access key;
       to receive a confirmation that a user device received the content access key;
       to receive a radio fingerprint of the user device, the radio fingerprint including a signal strength of a wireless network detected by the user device;
       to determine the user device is within the local area based at least in part on the radio fingerprint and receiving the confirmation;
       to allow the user device to access digital content based at least in part on determining the user device is within the local area;
       to perform a check on a location of the user device at a predetermined time interval;
       to determine the user device is outside the local area based at least in part on performing the check; and
       to discontinue to allow the user device to access the content based at least in part on determining the user device is outside the local area.

12. The system of claim 11, wherein the at least one processor is further configured to performing the check by transmitting a second audio signal including a second content access key, and wherein the at least one processor is configured to determine the user device is outside the local area based at least in part on failing to receive a second confirmation that the user device received the second content access key.

13. The system of claim 11, wherein the at least one processor is further configured to performing the check by transmitting an infrared signal including a second content access key, and wherein the at least one processor is configured to determine the user device is outside the local area based at least in part on failing to receive a second confirmation that the user device received the second content access key.

14. The system of claim 11, wherein the audio signal is transmitted in a frequency range inaudible to humans.

15. The system of claim 11, wherein the content access key is a cryptographic key and the digital content is encrypted using the cryptographic key.

16. The system of claim 11, wherein the at least one processor is further configured to receive the confirmation in a second audio signal.

* * * * *